United States Patent
Ziche et al.

(10) Patent No.: US 6,303,678 B1
(45) Date of Patent: Oct. 16, 2001

(54) STORAGE-STABLE ORGANOPOLYSILOXANE COMPOSITIONS WHICH CAN BE CROSSLINKED TO GIVE ELASTOMERS WITH ELIMINATION OF ALCOHOLS

(75) Inventors: Wolfgang Ziche; Norman Dorsch, both of Burghausen; Susanne Straussberger, Mehring; Wolfgang Hechtl, Burghausen, all of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/523,861

(22) Filed: Mar. 14, 2000

(30) Foreign Application Priority Data

Mar. 18, 1999 (DE) .............................. 199 12 223

(51) Int. Cl.⁷ .................................... C08L 19/00
(52) U.S. Cl. .................... 524/379; 524/366; 524/391; 524/588; 524/863; 528/18; 528/34
(58) Field of Search ................ 528/901, 18, 34; 524/588, 863, 366, 379, 391, 156, 127

(56) References Cited

U.S. PATENT DOCUMENTS

| | | |
|---|---|---|
| 3,334,067 | 8/1967 | Weyenberg . |
| 4,261,758 * | 4/1981 | Wright et al. . |
| 4,417,042 | 11/1983 | Dziark . |
| 4,513,115 * | 4/1985 | Beers . |
| 4,517,337 | 5/1985 | Lockhart et al. . |
| 4,537,944 | 8/1985 | Imai et al. . |
| 4,719,194 | 1/1988 | Cietek et al. . |
| 4,940,743 | 7/1990 | Grape et al. . |
| 5,519,104 * | 5/1996 | Lucas . |
| 5,744,703 * | 4/1998 | Krenceski et al. . |
| 5,895,794 * | 4/1999 | Berg et al. . |
| 5,959,018 * | 9/1999 | Miyake et al. . |

FOREIGN PATENT DOCUMENTS

| | | |
|---|---|---|
| 0 157 323 A2 | 10/1985 | (EP) . |
| 0 747 443 A2 | 12/1996 | (EP) . |
| 0 857 760 A1 | 8/1998 | (EP) . |
| 930470 | 7/1963 | (GB) . |

* cited by examiner

*Primary Examiner*—Robert Dawson
*Assistant Examiner*—Marc S. Zimmer
(74) *Attorney, Agent, or Firm*—Brooks & Kushman P.C.

(57) ABSTRACT

Stable RTV-1-alkoxy compositions contain a tin catalyst and surfactants (S) which contain divalent polyether units of the general formula (I)

$$—O—[(CR^{\alpha}R^{\beta})_u—O]_v— \qquad (I)$$

in which $R^{\alpha}$ and $R^{\beta}$ are hydrogen or a monovalent $C_1$–$C_{10}$-hydrocarbon radical optionally substituted by hydroxyl, fluorine, chlorine, bromine, $C_1$–$C_{10}$-alkoxyalkyl or cyano groups, u is from 1 to 6 and v is from 3 to 100. The compositions are stable despite the presence of the tin catalyst and alkoxy-functional organosilicon compounds.

16 Claims, No Drawings

STORAGE-STABLE ORGANOPOLYSILOXANE COMPOSITIONS WHICH CAN BE CROSSLINKED TO GIVE ELASTOMERS WITH ELIMINATION OF ALCOHOLS

TECHNICAL FIELD

The subject invention pertains to storage stable RTV-1-alkoxy compositions comprising a tin catalyst and an effective amount of one or more storage-stabilizing surfactants.

BACKGROUND ART

In the context of the present invention, the term organopolysiloxanes is intended to include dimeric, oligomeric and polymeric siloxanes.

The use of dialkyltin(IV) compounds as condensation catalysts in RTV-1- and RTV-2-silicone rubbers is generally known. However, in RTV-1-alkoxy compositions these tin compounds have the disadvantage that they also catalyze the unwanted cleavage of the siloxane chains by alcohol radicals, i.e. "equilibration", whereupon alkoxy end groups on the polysiloxane chain which are no longer capable of crosslinking are formed, and adequate crosslinking of the composition is therefore no longer possible: i.e. no adequately stable vulcanization product is obtained when the composition is used for the intended purpose. The storage stability, stated as the period of time which the RTV-1-alkoxy composition can be stored without noticeably losing its commercially acceptable properties, is drastically reduced by equilibration.

Known methods for prolonging the storage stability include:

The replacement of the tin catalyst by a titanium or aluminum chelated catalyst, for example as disclosed in U.S. Pat. No. 3,334,067. The disadvantage here is the yellow coloration of the compositions, as a result of which only opaque but no transluscent compositions are possible.

The replacement of the tin catalyst by a titanium catalyst of the general formula Ti(OR)$_4$, for example, as disclosed in EP-A-747 443, with the disadvantage that only siloxanes which contain no silanol groups can be processed. The use of adhesion promoters with such catalysts is limited because of adverse effects on t he activity of the catalyst.

Reduction in the amount of the tin catalyst, with the disadvantage of a very slow vulcanization.

The use of less aggressive tin catalysts, for example tin chelated catalysts, for example as disclosed in U.S. Pat. No. 4,517,337. An excess of chelating compound such as acetylacetonate, is necessary. However, this chelating agent is volatile, toxicologically unacceptable, a health hazard, and can also lead to yellowing of the vulcanization product.

The addition of alcohol-trapping agents, scavengers which react with alcohols on the basis of their high reactivity, for example as disclosed in U.S. No. 4,417, 042. However, the addition of such scavengers is not only expensive, but also impairs adhesion properties.

DISCLOSURE OF INVENTION

An object of the present invention is to provide RTV-1-alkoxy compositions which comprise a tin catalyst, have an increased storage stability and do not have the disadvantages of the known methods. The inventive to RTV-1-alkoxy compositions comprise a tin catalyst and surfactants (S) which contain divalent polyether un its of the general formula (I)

$$-O-[(CR^\alpha R^\beta)_u-O]_v- \qquad (I)$$

in which $R^\alpha$ and $R^\beta$ are hydrogen or a monovalent $C_1$–$C_{10}$-hydrocarbon radical optionally substituted by hydroxyl, fluorine, chlorine, bromine, $C_1$–$C_{10}$-alkoxyalkyl or cyano groups, u is from 1 to 6 and v is from 3 to 100, the RTV-1-alkoxy compositions being free of acid phosphoric acid esters of the general formula (II)

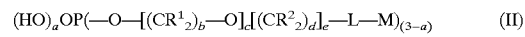

$$(HO)_aOP(-O-[(CR^1_2)_b-O]_c[(CR^2_2)_d]_e-L-M)_{(3-a)} \qquad (II)$$

in which a is 1 or 2, $R^1$ and $R^2$ are independently hydrogen, methyl, or hydroxyl radicals, b and d are 2or 3, c is from 2 to 15, e is 0 or 1, L is a radical from the group consisting of —O—, —COO—, —OOC—, —CONR$^3$—, —NR$^4$CO—and —CO—, $R^3$ and $R^4$ independently are hydrogen or, $C_1$–$C_{10}$-alkyl radical(s), and M is a monovalent $C_1$- to $C_{20}$-hydrocarbon radical which is optionally substituted by hydroxyl, fluorine, chlorine, bromine, $C_1$–$C_{10}$-alkoxyalkyl or cyano groups, with the proviso that not more than one of the radicals $R^1$ and $R^2$ on a given carbon atom can simultaneously be a hydroxyl radical.

The invention also relates to a process for stabilizing RTV-1-alkoxy compositions comprising a tin catalyst, in which surfactants (S) which contain divalent polyether units of the above general formula (I) are added to the compositions.

BEST MODE FOR CARRYING OUT THE INVENTION

The addition of surfactants (S) to RTV-1-alkoxy compositions comprising a tin catalyst has the effect of retarding or suppressing the equilibrating action of the tin catalysts, as a result of which the storage stability is increased drastically. At the same time, the desired condensation catalysis of the tin compounds used is activated. Polysiloxanes blocked on the ends in situ by phosphoric acid esters also remain processable.

Preferably, the surfactants (S) contain at least 20% by weight, in particular at least 50% by weight, of divalent polyether units of the general formula (I).

Preferably, in the general formula (I), independently of one another, $R^\alpha$ and $R^\beta$ are a hydrogen radical or a monovalent unsubstituted hydrocarbon radical, in particular hydrogen or $C_1$–$C_3$-alkyl radicals, such as the methyl or ethyl radical;

u is an integer from 1 to 4, in particular 2 or 3; and v is an integer from 3 to 25, in particular from 5 to 10.

The surfactants (S) can be nonionic, anionic or cationic surfactants, in particular, emulsifiers. Examples of surfactants (S) are: fatty acid esters, for example of the formula R'—C(=O)—Y—R"; fatty alkyl ether carboxylates, for example of the formula R'—Y—CH$_2$COOX; fatty alcohol polyglycol ethers, for example of the formula R'—Y—R"; phenol polyglycol ethers, for example of the formula Ar—Y—R'; fatty alkyl ether sulfates, for example of the formula R'—Y—SO$_3$X; alkyl ether phosphates, polydimethylsiloxanes having polyether groups, oxyethylates and ethers thereof, such as, for example, polyethylene glycol, polypropylene glycol, polyethylene glycol diethers, polypropylene glycol diether and copolymers thereof, fatty amine oxyethylates, and polyglycol sulfonates.

In the above surfactants (S)

R' and R" are $C_6$–$C_{30}$-alkyl radicals,

Y is a divalent polyether unit of the general formula (I),

X is Na or K and

Ar are $C_6$–$C_{30}$-aryl radicals or $C_7$–$C_{30}$-aralkyl radicals.

Preferably, the RTV-1-alkoxy compositions comprising a tin catalyst comprise at least 0.01%, in particular at least 0.1%, by weight, and preferably not ore than 10%, in particular not more than 5%, by weight of surfactants (S).

The RTV-1-alkoxy compositions comprising a tin catalyst comprise (A) organopolysiloxane(s) with terminal alkoxy groups and (B) alkoxysilane(s) which contain at least three alkoxy groups, and/or partial hydrolysis products thereof.

The organopolysiloxanes (A) with terminal alkoxy groups are preferably linear diorganosiloxanes of the general formula (III)

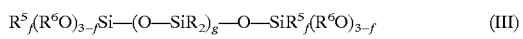

in which

R, $R^5$ and $R_6$ are each independently monovalent $C_1$–$C_8$-hydrocarbon radicals, optionally substituted by fluorine, chlorine, bromine, $C_1$–$C_4$-alkoxyalkyl or cyano groups, f is 0 or 1 and g is a value which corresponds to a viscosity of the organopolysiloxane (A) of from 0.05 to 1000 Pa·s.

Preferred radicals R, $R^5$ and $R^6$ are unsubstituted $C_1$–$C_4$-alkyl radicals, the methyl radical being particularly preferred. The organopolysiloxanes (A) preferably have a viscosity of from 100 to 700,000 mPa·s, in particular from 20,000 to 350,000 mPa·s, in each case measured at 23° C. Preferably, the RTV-1-alkoxy compositions comprising a tin catalyst comprise at least 35%, more preferably at least 45%, by weight, preferably not more than 80%, and more preferably not more than 70% by weight of organopolysiloxanes (A).

The alkoxysilanes (B) preferably have the general formula (IV)

in which $R^7$ and $R^8$ are monovalent $C_1$–$C_{13}$-hydrocarbon radicals which are optionally substituted by fluorine, chlorine, bromine, $C_1$–$C_4$-alkoxyalkyl or cyano groups and $\mu$ is 0 or 1.

The partial hydrolysis products of alkoxysilane (B) are formed by hydrolysis and condensation of, in particular, 2 to 4 alkoxysilanes. Partial hydrolysis products (B) are, for example, hexamethoxydisiloxane and hexaethoxydisiloxane.

Preferably, $R^7$ is an unsubstituted $C_1$–$C_6$-hydrocarbon radical, in particular a methyl, ethyl, or propyl radical. Preferably, $R^8$ is an unsubstituted $C_1$–$C_6$-hydrocarbon radical, in particular a methyl, ethyl, vinyl or propyl radical.

Preferably, the RTV-1-alkoxy compositions comprising a tin catalyst comprise at least 0.5%, more preferably at least 2%, by weight, and preferably not more than 8%, more preferably not more than 6% by weight of alkoxysilane (B) and/or a partial hydrolysis products thereof.

The tin catalysts are preferably organotin compounds, such as di-n-butyltin diacetate, di-n-butyltin dilaurate, and reaction products of a silane or oligomer thereof, containing per molecule, at least two hydrolyzable monovalent hydrocarbon radicals which are bonded to silicon via oxygen and optionally substituted by an alkoxy group, with a diorganotin diacylate, all the valencies of the tin atoms in these reaction products being satisfied by oxygen atoms of the group ≡SiOSn≡ or ≡COSn≡ or by SnC-bonded, monovalent organic radicals.

Preferably, the RTV-1-alkoxy compositions comprising a tin catalyst comprise at least 0.01%, more preferably at least 0.1%, by weight, and preferably not more than 3%, more preferably not more than 1% by weight of tin catalyst.

In addition to the abovementioned components, the RTV-1-alkoxy compositions comprising a tin catalyst can comprise further components which are known per se, such as crosslinking agents; fillers; pigments; soluble dyestuffs; odoriferous substances; plasticizers; fungicides; resinous organopolysiloxanes, including those from $(CH_3)_3SiO_{1/2}$ and $SiO_{4/2}$ units; purely organic resins; such as homo- or copolymers of acrylonitrile, styrene, vinyl chloride or propylene, it being possible for such purely organic resins, in particular copolymers of styrene and n-butyl acrylate, already to have been produced by polymerization of the monomers mentioned by means of free radicals in the presence of a diorganopolysiloxane containing an Si-bonded hydroxyl group in each of the terminal units; corrosion inhibitors; oxidation inhibitors; heat stabilizers; solvents; agents for influencing the electrical properties such as conductive carbon black; agents which render the composition flame-repellant; light stabilizers; agents for prolonging the skin formation time such as silanes containing SiC-bonded mercaptoalkyl radicals; and cell-generating agents, for example azodicarboxamide. Adhesion promoters can likewise be added.

Further crosslinking agents which may be present in addition to the ho alkoxysilanes (B) in the RTV-1-alkoxy compositions comprising a tin catalyst are bis(trialkoxysilyl) $C_1$–$C_{12}$-alkanes in which the alkoxy radicals have the meanings of $OR^8$, for example bis(trimethoxysilyl)ethane.

The RTV-1-alkoxy compositions comprising a tin catalyst preferably contain fillers. Examples of fillers are non-reinforcing fillers, i.e. fillers having a BET surface area of up to 50 m$^2$/g, such as chalks coated with carboxylic acid, quartz, diatomaceous earth, calcium silicate, zirconium silicate, zeolites, metal oxide powders such as aluminum, titanium, iron or zinc oxides and mixed oxides thereof, barium sulfate, calcium carbonate, gypsum, silicon nitride, silicon carbide, boron nitride and powders of glass and plastics, such as polyacrylonitrile powder; reinforcing fillers, i.e. fillers having a BET surface area of more than 50 m$^2$/g, such as pyrogenically prepared silicic acid, precipitated silicic acid, carbon black, such as furnace and acetylene black, and silicon-aluminum mixed oxides of high BET surface area; and fibrous fillers, such as asbestos and synthetic fibers.

The fillers mentioned can be hydrophobized, for example by treatment with organosilanes or organosiloxanes or with stearic acid or by etherification of hydroxyl groups to alkoxy groups. One type of filler can be employed, and mixtures of at least two fillers can also be employed. If reinforcing silicic acid is used solely as a filler, transparent RTV-1-alkoxy compositions can be prepared. Preferably, the RTV-1-alkoxy compositions comprising a tin catalyst comprise at least 2%, more preferably at least 5%, by weight, and preferably not more than 40%, more preferably not more than 15% by weight of filler.

Plasticizers which can be employed are, for example, alkylaromatics, phosphoric acid esters, or polydimethylsiloxanes which are blocked by trimethylsiloxy end groups and which are liquid at room temperature. Preferred dimethylpolysiloxanes which are employed as plasticizers have the general formula (V)

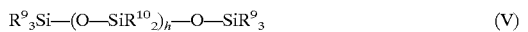

$R^9{}_3Si-(O-SiR^{10}{}_2)_h-O-SiR^9{}_3$ (V)

in which $R^9$ and $R^{10}$ have the meanings of R and h is a value which corresponds to a viscosity of the dimethylpolysiloxane of from 10 to 500 mPa·s.

Preferably, the RTV-1-alkoxy compositions comprising a tin catalyst comprise at least 10%, more preferably at least 20%, by weight, and preferably not more than 50%, more preferably not more than 35% by weight of plasticizer.

Adhesion promoters which can be employed are, for example, aminoalkyl-functional silanes. Preferred silanes are those of the general formula (VI)

$Z-(CH_2)_3-Si(OR^{11})_3$ (VI)

in which

Z has the meanings $NH_2$, $NH-CH_2CH_2NH_2$, NHR, and glycidoxy, and $R^{11}$ has the meaning of R.

γ-Aminopropyltriethoxysilane is particularly preferred.

Preferably, the RTV-1-alkoxy compositions comprising a tin catalyst comprise no adhesion promoter, or up to 1% by weight, and preferably not more than 4%, more preferably not more than 3% by weight of adhesion promoter.

In the general formulae (I) to (VI), all the radicals X, Y, Z, Rα, Rβ, R, $R^1$ to $R^{11}$ and all the indices a, b, c, d, e, f, g, h, m, u, v and μ independently of one another are identical or different, and in all the formulae, silicon atoms are tetravalent.

The usual water content of air is adequate for crosslinling the RTV-1-alkoxy compositions comprising a tin catalyst. If desired, the crosslinking can also be carried out at temperatures higher or lower than room temperature, for example at from −5° to 10° C., or at from 30° to 50° C.

The RTV-1-alkoxy compositions comprising a tin catalyst are thus excellently suitable for use as sealing compositions for joints, including joints which run vertically, and similar empty spaces of, for example, from 10 to 40 mm internal diameter, in buildings, land, water and air vehicles, or as adhesives or cementing compositions, for example in window construction, and, for the production of protective coatings or of rubber-elastic shaped articles, and for insulating electrical or electronic devices.

In the examples described below, all parts stated with percentages are percent by weight, unless indicated otherwise. Furthermore, all the viscosities stated are measured at a temperature of 25° C. Unless indicated otherwise, the examples below are carried out at the pressure of the surrounding atmosphere, that is to say at about 1000 hPa, and at room temperature, that is to say at about 20° C., or at a temperature which is established when the reactants are brought together at room temperature without additional heating or cooling.

EXAMPLES

The storage stability is determined as a function of the storage time with the aid of vulcanization of the RTV-1-alkoxy compositions (compounds) to give elastic rubbers. Aging of the compounds is accelerated by storage at 50° C.

Examples 1–4

55.4 parts by weight of a polydimethylsiloxane having $-OSi(OCH_3)_2(CH_3)$ end groups and a viscosity of 80,000 m·Pas, are mixed with 31.2 parts by weight of a polydimethylsiloxane having $-OSi(CH_3)_3$ end groups (viscosity 100 m·Pas), 4.0 parts by weight of methyltrimethoxysilane, and 1.0 part by weight of emulsifier, with exclusion of water, in a planetary mixer fitted with vacuum equipment. 8.0 parts by weight of pyrogenic silicic acid are then mixed in, and finally 0.4 part by weight of a tin catalyst (the reaction product of 4 parts of tetraethoxysilane with 2.2 parts of dibutyltin diacetate). After homogenization in vacuo, the compound is transferred to a moisture-tight container. The surfactants used and the results are shown in Table 1.

Comparison Example 5 (not according to the invention)

The procedure is as under Examples 14, except that no emulsifier is added. The results are shown in Table 1.

TABLE 1

While the compounds with added surfactant vulcanize, no rubber is obtained without the addition of the surfactant. If Comparison Example 5 is carried out with twice the amount of catalyst, at least a slight initial vulcanization is to be found after storage at room temperature for 3 days. After storage at 50° C. for 2 weeks, the compound no longer vulcanizes. These examples show the activation of the desired catalyst action and the suppression of the unwanted equilibration.

TABLE 1

| | Surfactant | Vulcanization after 3 days at RT | Vulcanization after 2 weeks at 50° C. |
|---|---|---|---|
| Example 1 | isotridecyl alcohol (10)-polyglycol ether | good | none observable |
| Example 2 | polymer of propylene oxide and ethylene oxide | good | good |
| Example 3 | polyglycol ether phosphate | good | good, tacky |
| Example 4 | tributylphenol polyglycol ether | tacky, soft | good, tacky |
| Comparison Example 5 | none | no vulcanization | no vulcanization |

RT: room temperature

Examples 6–9

54.4 parts by weight of a polydimethylsiloxane having $-OSi(OCH_3)_2(CH_3)$ end groups and a viscosity of 80,000 m·Pas, are mixed with 30.5 parts by weight of a polydimethylsiloxane having $-Si(OCH_3)_3$ end groups (viscosity 100 m·Pas), 4.0 parts by weight of methyltrimethoxysilane, 1.8 parts by weight of a polydimethylsiloxane containing 3-aminopropyl groups, and 1.0 part by weight of emulsifier, with exclusion of water, in a planetary mixer fitted with vacuum equipment. 7.9 parts by weight of pyrogenic silicic acid are then mixed in, and finally 0.4 part by weight of a tin catalyst (the reaction product of 4 parts of tetraethoxysilane with 2.2 parts of dibutyltin diacetate). After homogenization in vacuo, the compound is transferred to a moisture-tight container. The surfactants used and the skin formation times (SFT) are shown in Table 2.

Comparison Example 10 (not according to the invention)

The procedure is as under Examples 6–9, except that no emulsifier is added. The results are shown in Table 2.

TABLE 2

| | Surfactant | SFT after 1 day at RT [min] | Vulcanization after 1 day at RT [min] | SFT after 1 week at 50° C. [min] | Vulcanization after 1 week at 50° C. [min] |
|---|---|---|---|---|---|
| Example 6 | isotridecyl alcohol(10)-polyglycol ether | 20 | good | 20 | good |
| Example 7 | polymer of propylene oxide and ethylene oxide | 20 | good | 20 | good |
| Example 8 | polyglycol ether phosphate | 20 | good | 20 | good |
| Example 9 | tributylphenol polyglycol ether | 20 | good | 20 | good |
| Comparison Example 10 | — | 20 | good | 20 | brittle not elastic |

Although the SFT for Comparison Example 10 remains stable, the vulcanization is impaired by the equilibration which has occurred.

Example 11

54.0 parts by weight of a polydimethylsiloxane having OH end groups and a viscosity of 80,000 m·Pas, are mixed with 30 parts by weight of a polydimethylsiloxane having $OSi(OCH_3)_3$ end groups (viscosity 100 m·Pas), 4 parts by weight of a 2:1 mixture of methyltrimethoxysilane and vinyltrimethoxysilane, 0.8 part by weight of a polyglycol phosphate and 0.2 part by weight of an acid phosphoric ester, with exclusion of water, in a planetary mixer fitted with vacuum equipment. 2.2 parts by weight of an adhesion promoter containing aminopropyl groups are then added, 8.5 parts by weight of pyrogenic silicic acid are mixed in, and finally 0.4 part by weight of a tin catalyst (the reaction product of 4 parts of tetraethoxysilane with 2.2 parts of dibutyltin diacetate). After homogenization in vacuo, the compound is transferred to a moisture-tight container.

The skin formation time of the composition given as an example has an initial value of 20 minutes; this value remains unchanged even after 28 days/50° C. and 56 days/50° C. The compound vulcanizes well.

Comparison Example 12 (not according to the invention)

The procedure of Example 11 is followed, except that no emulsifier is added. The composition cannot be compounded to a finished composition after the addition of the adhesion promoter containing 3-aminopropyl groups, since it becomes inhomogeneous and rubber-like.

These examples demonstrate that the processability of a siloxane blocked on the ends in situ is retained. The long storage stability of the RTV-1-alkoxy composition is demonstrated at the same time.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An RTV-1-alkoxy composition which comprises at least one tin catalyst which comprises a reaction product of a silane or silane oligomer containing at least two hydrolyzable, monovalent, silicon-bonded oxyhydrocarbon radicals optionally substituted by one or more alkoxy groups, with a diorganotin diacylate, wherein valencies of tin are satisfied by oxygen atoms or carbon atoms, and the tin and oxygen linkages comprise Sn—O—Si and Sn—O—C linkages; and at least one surfactant (S) which contains divalent polyether units of the general formula (I)

$$—O—[(CR^{\alpha} R^{\beta})_u—O]_v— \quad (I)$$

in which $R^{\alpha}$ and $R^{\beta}$ are independently hydrogen or a monovalent $C_1$–$C_{10}$-hydrocarbon radical optionally substituted by hydroxyl, fluorine, chlorine, bromine, $C_1$–$C_{10}$-alkoxyalkyl or cyano groups, u is from 1 to 6 and v is from 3 to 100, the RTV-1-alkoxy composition being free of acid phosphoric acid esters of the general formula (II)

$$(HO)_aOP(—O—[(CR^1_2)_b—O]_c[(CR^2_2)_d]_e—L—M)_{(3-a)} \quad (II)$$

in which a is 1 or 2, $R^1$ and $R^2$ are independently hydrogen, methyl, or hydroxyl radicals, b and d are 2 or 3, c is from 2 to 15, e is 0 or 1, L is a radical from the group consisting of —O— —COO—, —OOC—, —CONR³—, —NR⁴CO— and —CO—, $R^3$ and $R^4$ are independently hydrogen or a $C_1$–$C_{10}$-alkyl radical and M is a monovalent $C_1$- to $C_{20}$-hydrocarbon radical optionally substituted by hydroxyl, fluorine, chlorine, bromine, $C_1$–$C_{10}$-alkoxyalkyl or cyano groups, with the proviso that the radicals $R^1$ and $R^2$ on a given carbon atom cannot both be a hydroxyl radical.

2. An RTV-1-alkoxy composition as claimed in claim 1, in which the surfactants (S) contain at least 20% by weight of divalent polyether units of the general formula (I).

3. An RTV-1-alkoxy composition as claimed in claim 1, in which $R^{\alpha}$ and $R^{\beta}$ in the general formula (I) independently of one another are hydrogen or $C_1$–$C_3$-alkyl radicals.

4. An RTV-1-alkoxy composition as claimed in claim 2, in which $R^{\alpha}$ and $R^{\beta}$ in the general formula (I) independently of one another are hydrogen or $C_1$–$C_3$-alkyl radicals.

5. A process for stabilizing RTV-1-alkoxy compositions containing a tin catalyst, said process comprising selecting as at least one catalyst a tin catalyst comprising a reaction product of a silane or silane oligomer containing at least two hydrolyzable, monovalent, silicon-bonded oxyhydrocarbon radicals optionally substituted by one or more alkoxy groups, with a diorganotin diacylate, wherein valencies of tin are satisfied by oxygen atoms or carbon atoms, and the tin and oxygen linkages comprise Sn—O—Si and Sn—O—C linkages; and adding to said RTV-1 alkoxy compositions an effective stabilizing amount of one or more surfactants (S) which contain divalent polyether units of the general formula (I) as claimed in claim 1.

6. The process of claim 5 wherein said surfactant(s) contain at least 20% by weight of divalent polyether units of the general formula (I).

7. The process of claim 5, wherein $R^\alpha$ and $R^\beta$ in the general formula (I) independently of one another are hydrogen or $C_1$–$C_3$-alkyl radicals.

8. The process of claim 6, wherein $R^\alpha$ and $R^\beta$ in the general formula (I) independently of one another are hydrogen or $C_1$–$C_3$-alkyl radicals.

9. The composition of claim 1, which contains no alcohol scavenger.

10. The composition of claim 2, which contains no alcohol scavenger.

11. The process of claim 5, wherein said RTV-1 alkoxy compositions contain no alcohol scavenger.

12. The process of claim 6 wherein said RTV-1 alkoxy compositions contain no alcohol scavenger.

13. An RTV-1-alkoxy composition which comprises a tin catalyst and at least one surfactant (S) which contains divalent polyether units of the general formula (I)

  (I)

in which $R^\alpha$ and $R^\beta$ are independently hydrogen or a monovalent $C_1$–$C_{10}$-hydrocarbon radical optionally substituted by hydroxyl, fluorine, chlorine, bromine, $C_1$–$C_{10}$-alkoxyalkyl or cyano groups, u is from 1 to 6 and v is from 3 to 100, the RTV-1-alkoxy composition being free of acid phosphoric acid esters of the general formula (II)

  (II)

in which a is 1 or 2, $R^1$ and $R^2$ are independently hydrogen, methyl, or hydroxyl radicals, b and d are 2 or 3, c is from 2 to 15, e is 0 or 1, L is a radical from the group consisting of —O— —COO—, —OOC—, —CONR$^3$—, —NR$^4$CO— and —CO—, $R^3$ and $R^4$ are independently hydrogen or a $C_1$–$C_{10}$-alkyl radical and M is a monovalent $C_1$- to $C_{20}$-hydrocarbon radical optionally substituted by hydroxyl, fluorine, chlorine, bromine, $C_1$–$C_{10}$-alkoxyalkyl or cyano groups, with the proviso that the radicals $R_1$ and $R^2$ on a given carbon atom cannot both be a hydroxyl radical, and wherein said composition contains no alcohol scavenger.

14. An RTV-1-alkoxy composition as claimed in claim 13, in which said surfactant (S) contains at least 20% by weight of divalent polyether units of the general formula (I).

15. A process for stabilizing RTV-1-alkoxy compositions comprising a tin catalyst, said process comprising adding to said RTV-1-alkoxy compositions an effective stabilizing amount of one or more surfactants (S) which contain divalent polyether units of the general formula (I) as claimed in claim 1, wherein said RTV-1 alkoxy compositions contain no alcohol scavenger.

16. The process of claim 15 wherein said surfactant(s) contain at least 20% by weight of divalent polyether units of the general formula (I).

* * * * *

UNITED STATES PATENT AND TRADEMARK OFFICE
CERTIFICATE OF CORRECTION

PATENT NO. : 6,303,678 B1
DATED : October 16, 2001
INVENTOR(S) : Wolfgang Ziche et al.

Page 1 of 1

It is certified that error appears in the above-identified patent and that said Letters Patent is hereby corrected as shown below:

Column 8,
Line 26, replace "-O-[(CR$^{60}$R$^{\beta}$)$_u$-O]$_v$- (I)"

with correct formula:

-- -O-[(CR$^{\alpha}$R$^{\beta}$)$_u$-O]$_v$- (I) --

Column 10,
Line 32, replace "RTV-1-alkoxy" with -- RTV-1 alkoxy. --

Signed and Sealed this

Twenty-first Day of May, 2002

Attest:

JAMES E. ROGAN
*Director of the United States Patent and Trademark Office*

*Attesting Officer*